(12) United States Patent
Gustafson et al.

(10) Patent No.: US 7,116,646 B1
(45) Date of Patent: Oct. 3, 2006

(54) CDMA INTERNET PROTOCOL MOBILE TELECOMMUNICATIONS NETWORK ARCHITECTURE AND METHODOLOGY

(75) Inventors: Ulf Gustafson, Palo Alto, CA (US); Henrik Basilier, Menlo Park, CA (US)

(73) Assignee: Telefonakitebolaget LM Ericsson (publ), (SE)

(*) Notice: Subject to any disclaimer, the term of this patent is extended or adjusted under 35 U.S.C. 154(b) by 0 days.

(21) Appl. No.: 09/528,553

(22) Filed: Mar. 20, 2000

Related U.S. Application Data

(60) Provisional application No. 60/187,547, filed on Mar. 7, 2000.

(51) Int. Cl.
*H04Q 7/00* (2006.01)
*H04L 12/66* (2006.01)
*H04B 7/216* (2006.01)

(52) U.S. Cl. ............... 370/313; 370/349; 370/352
(58) Field of Classification Search ........ 370/352–356, 370/328, 338, 401; 455/426, 436, 445, 552, 455/553, 560
See application file for complete search history.

(56) References Cited

U.S. PATENT DOCUMENTS

| | | | |
|---|---|---|---|
| 5,936,952 A | | 8/1999 | Lecomte |
| 6,301,471 B1 * | | 10/2001 | Dahm et al. ............... 455/405 |
| 6,442,401 B1 * | | 8/2002 | Behan ...................... 455/552.1 |
| 6,487,406 B1 * | | 11/2002 | Chang et al. ............. 455/422.1 |
| 6,560,239 B1 * | | 5/2003 | Frid et al. ................. 370/426 |
| 6,580,699 B1 * | | 6/2003 | Manning et al. ............. 370/331 |
| 6,591,103 B1 * | | 7/2003 | Dunn et al. ................ 455/436 |
| 6,636,491 B1 * | | 10/2003 | Kari et al. .................. 370/328 |

FOREIGN PATENT DOCUMENTS

| | | |
|---|---|---|
| GB | 2 301 992 | 12/1996 |
| WO | WO95/25407 | 9/1995 |
| WO | WO95/31060 | 11/1995 |
| WO | WO9832301 | * 7/1998 |
| WO | WO99/16266 | 4/1999 |
| WO | WO99/49690 | 9/1999 |
| WO | WO99/52236 | 10/1999 |
| WO | WO99/63774 | 12/1999 |

OTHER PUBLICATIONS

Chaudhury P., et al., "The 3GPP Proposal for IMT-2000", IEEE Communications Magazine, Dec. 1999, pp. 72-81.
Digital Cellular Telecommunications System (Phase 2+), General Packet Radio Service (GPRS), Service description, Stage 2 (GSM 03.60 version 7.1.1 Release 1998, ETSI Standard, Jan. 1, 2000, pp. 1-115.

* cited by examiner

*Primary Examiner*—Chau Nguyen
*Assistant Examiner*—Soon D. Hyun
(74) *Attorney, Agent, or Firm*—Coats & Bennett, P.L.L.C.

(57) ABSTRACT

A system and methodology for implementing an all-Internet Protocol for voice and data communications on a code division multiple access (CDMA) network. An access control server is employed to handle packetized communications within the CDMA network. The methodology is preferably also employed when migrating from a legacy, circuited-switched system to the improved packet-switched, all-IP CDMA system of the present invention.

36 Claims, 9 Drawing Sheets

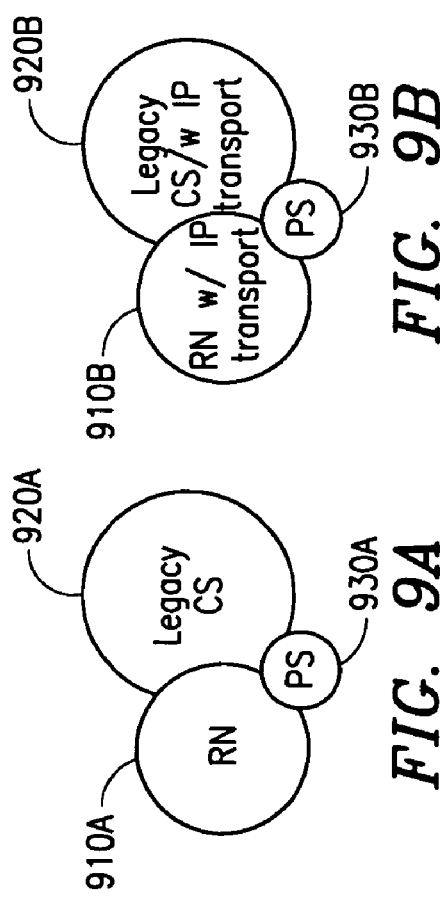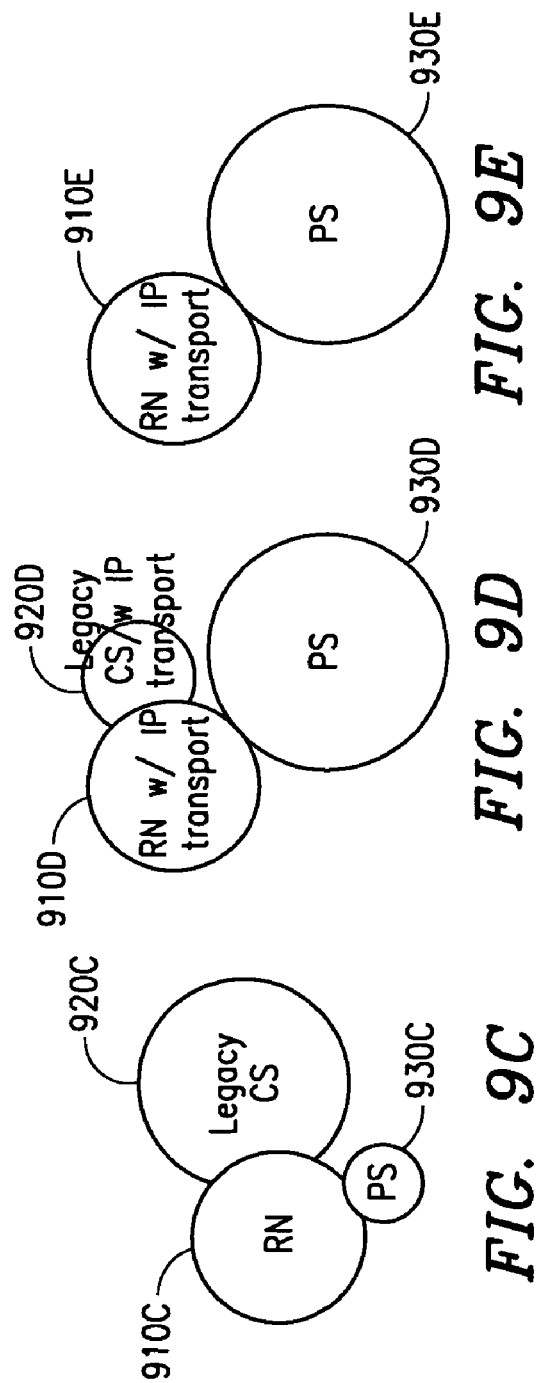
FIG. 9A  FIG. 9B  FIG. 9C  FIG. 9D  FIG. 9E

CDMA INTERNET PROTOCOL MOBILE TELECOMMUNICATIONS NETWORK ARCHITECTURE AND METHODOLOGY

CROSS REFERENCE TO RELATED APPLICATIONS

This application claims the benefit of priority under 35 U.S.C. §119 to U.S. Provisional Application Ser. No. 60/187,547, filed Mar. 7, 2000, which is fully incorporated herein by reference.

BACKGROUND OF THE INVENTION

1. Technical Field of the Invention

The present invention relates to the field of mobile telecommunications and, in particular, to an all Internet Protocol (IP) code division multiple access (CDMA) mobile telecommunications system, and methodology for the implementation thereof.

2. Description of Related Art and Background

The evolution of wireless communication over the past century, since Guglielmo Marconi's 1887 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

While the advantages of wireless communications are numerous, the limitations are also clearly defined, most notably the finite bandwidth available for cellular services. While the Federal Communications Commission (FCC) may, from time to time, provide additional bands for cellular services, wireless bandwidth is inherently limited. Thus, the technical challenge is to maximize the utilization of the available capacity, a strategy demonstrated by the dominance of digital cellular over its analog counterpart. Through digitalization of wireless communications, the advantages of multiplexing and voice compression by way of voice coding are achieved, both providing additional channels for a given bandwidth. Although digital multiplexing systems have proven efficient and successful on enormous scales, e.g., the Global System for Mobile Communications (GSM), the drive for increased traffic over a limited bandwidth continues. Most recently, the emergence of code division multiple access (CDMA) has promised to reshape the industry.

CDMA, in general, converts a narrowband modulated signal and spreads it across a much wider bandwidth, e.g., over 1000 times the source bandwidth in some systems, by multiplication of a pseudorandom code sequence, e.g., the well-known Walsh codes. Originally developed for military applications in its simplest form, i.e., frequency hopping, spread spectrum modulation techniques have been used in some American military satellites for over twenty-five years in large part to capitalize on the inherent security offered by spread spectrum transmissions. CDMA has recently emerged as a viable cellular telecommunications modulation scheme, as demonstrated by the numerous commercial CDMA networks now in operation.

Packet data services are not new to the cellular world. GSM, for example, provides packet services through the use of a packet assembler and disassembler (PAD) device, although currently the GSM standard is a circuit-switched architecture. Thus, in order to access a packet-switched data network, e.g., the Internet, a packet assembler and disassembler must transform the asynchronous data streams from GSM to data packages for transmission across a packet data network. In GSM, for example, the packet assembler and disassembler is invoked by command of a mobile services switching center (MSC), which also directs the circuit-switched voice allocations, as is well understood in the telecommunications arts.

Until recently, the prospect of an all Internet Protocol (IP), i.e., substantially all-packetized communications, mobile telecommunications network has been technologically unfeasible. Packet services in cellular telecommunications have heretofore generally been limited to data services where latency issues may have low priority. More specifically, the potential for an all-IP cellular service has been hindered by unacceptable time delays introduced into the delivery of packets, particularly, packets carrying speech data. However, with continuing advances in switching speeds and the continued development of additional cellular infrastructure, for example, packet latency in cellular applications has been reduced to levels where cellular voice IP services are now considered viable. The present invention proposes an architecture for a cellular telecommunications system for providing all services, whether voice or data, according to an IP protocol.

By combining bandwidth efficiencies of a CDMA protocol cellular telecommunications system with all-IP delivery, a more efficient utilization of radio resources is realized, providing advantages over all currently employed cellular systems including analog, Time Division Multiple Access (TDMA) and CDMA.

With the evolution of CDMA as an increasingly viable standard for wireless communications, current CDMA architectures, e.g., the cdma2000 packet data architecture, must adapt to the growing data servicing needs. One difficulty of the current cdma2000 architecture is an inherent tight connection between the conventional circuit-switched (CS) functions or domains and the increasingly important packet-switched functionalities or domains. For example, the cdma2000 architecture requires a Mobile Switching Servicing Center (MSC) for handling not only the typical CS voice calls but also setting up and maintaining packet data session and services. The justification for this tight connection was to reuse, where possible, existing functionality and readily available equipment.

Applicant believes that legacy voice services, i.e., CS-based connections, should evolve towards Internet Protocol (IP) transport, but that this evolution should be independent of that of PS services, enabling the different domains to advance at different paces. A step-wise evolution also enables a network carrier to stop evolving at any step and jump steps to provide enhanced services. As circuit-switching modalities become more outdated and are replaced, all-packet data networks become more and more a reality.

As mentioned, a current CDMA standard is the cdma packet data architecture (TIA PN-4286/3GPP2 PS0001), which embraces IETF protocols, particularly, mobile IP with Authorization Authentication and Accounting (AAA) bundling. With the tight connection between the CS and PS domains in this architecture, it is currently impossible to build a packet data network without a conventional MSC, which, because it is CS-based by its very nature, limits advancements to packet data services throughout the network, thereby hindering progress in the telecommunications and by limiting bandwidth capacity.

In view of the growing demand for and anticipated emergence of an all-packetized cellular system and protocol, there is clearly a need for a methodology addressing these emerging advances, particularly, regarding movement toward an all-IP CDMA implementation. Since most companies would rather not be on the cutting or bleeding edge of technological advances, the methodology should provide a mechanism for supporting legacy equipment, i.e., non-all-IP or voice circuit-switched devices, for a non-bleeding edge conversion to an increasingly packet-switched voice and data protocol and telecommunications network.

It is, therefore, an object of the present invention to provide an economically improved methodology to enable telecommunications system operators to stepwise migrate from conventional circuit-switched networks and mixed circuit-switched and packet data networks to an increasingly predominant packet data switching network.

It is also an object of the present invention to, in addition to evolving a network to packet switching, offer the simultaneous and independent ability to allow the telecommunications systems operators to evolve the voice circuit-switched domain to accommodate local traffic needs.

It is a further object of the present invention to improve upon existing standards e.g., the current cdma2000 architecture, that tightly bind CS-domain functionalities with the PS-domain functionalities, particularly, by routing all communications, whether CS-based voice of PS-based data, through an MSC, the improvements resulting in enhanced efficiencies.

SUMMARY OF THE INVENTION

The present invention is directed to a system architecture and methodology for the implementation of a packetized telecommunications network, particularly, an all Internet Protocol (IP) code division multiple access (CDMA) telecommunications system. An access control server is used to handle a packetized stream of voice and data in the improved system and methodology.

An additional aspect of the present invention is to provide a methodology for the evolution of a legacy, circuit-switched-based architecture, primarily directed to voice connections and services, to a new packet-switched-based architecture for handling initially the data services problematic for circuit-switched equipment, e.g., a mobile services switching center (MSC), and ultimately supplanting the functionality of the MSC by incorporating packetized voice services within the functionality of the access control server.

BRIEF DESCRIPTION OF THE DRAWINGS

For a more complete understanding of the present invention, reference is now made to the following detailed description taken in conjunction with the accompanying drawings wherein:

FIGS. 9A–9E illustrate a progression or migration of conventional circuit-switched and packet-switched networks towards an IP-based, packetized architecture pursuant to the methodologies set forth in the present invention.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
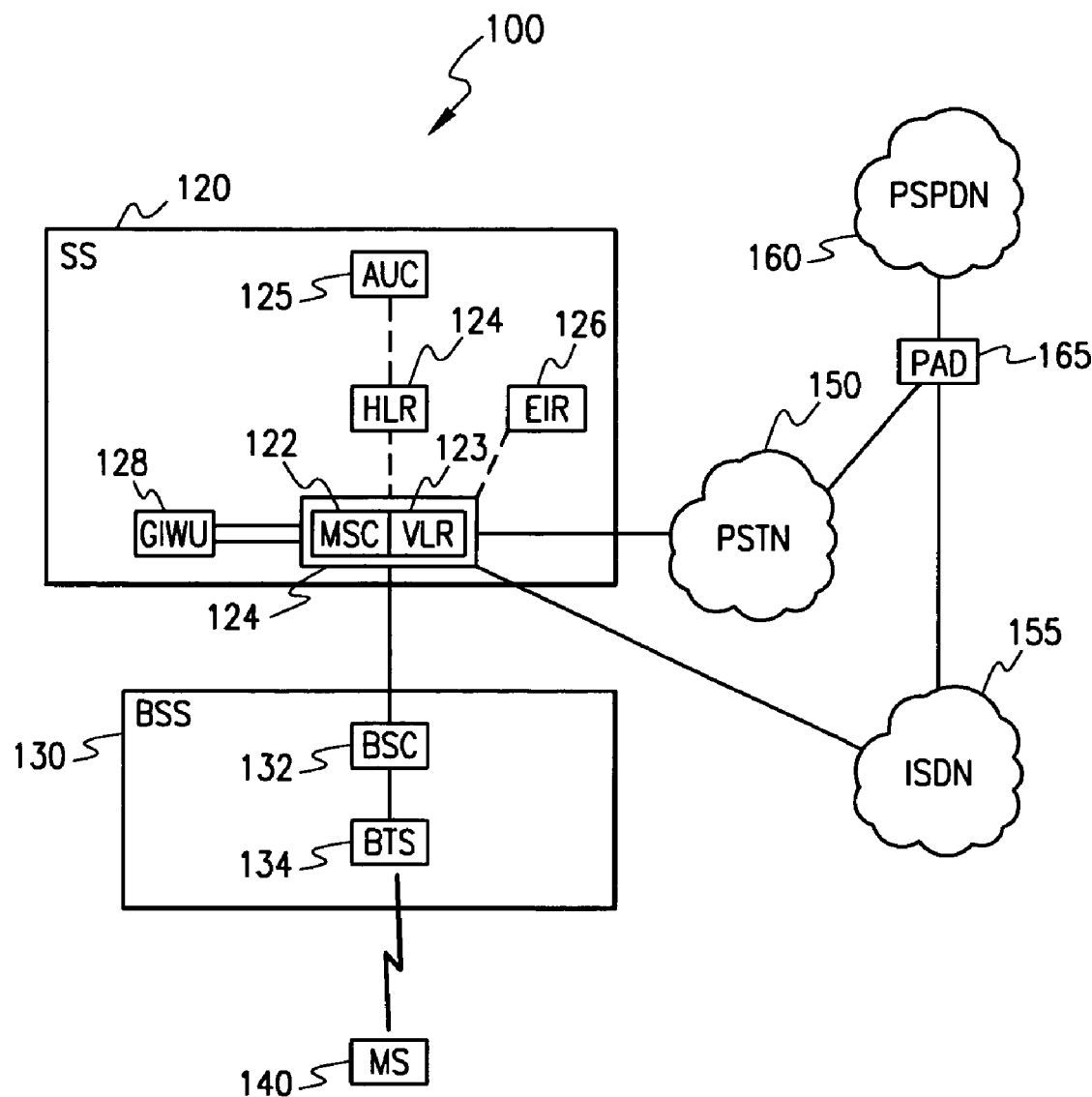
FIG. 1 illustrates a conventional packet data service configuration, such as used in code division multiple access telecommunications networks.

The present invention may be better understood with reference to FIG. 1, which illustrates a conventional packet data service scheme, as implemented in a mobile telecommunications system, generally designated by the reference numeral 100. Telecommunication system 100 is, in general, divided into a Switching System (SS) 120 and a Base Station System (BSS) 130, also referred to herein as a Base Station (BS). Each of the SS 120 and BSS 130 contain a number of functional units therein implemented in various hardware and software, where the functionality of each are well understood by those skilled in the art.

Specifically, SS 120 contains a Mobile services Switching Center (MSC) 122, a Visitor Location Register (VLR) 123, a Home Location Register (HLR) 124, an Authentication Center (AUC) 125, an Equipment Identity Register (EIR) 126, an internetworking unit 128, such as a GSM Internetworking Unit (GIWU). It should be understood that the MSC 122 and the VLR 123 may be co-located or integrated into a single unit, e.g., an MSC/VLR, as illustrated in FIG. 1, or be configured into discrete separate units. The BSS 130, in turn, contains a Base Station Controller (BSC) 132 in communication with and control of a plurality of Base Transceiver Stations (BTSs), a representative one of which is illustrated and designated by the reference numeral 134.

As is well understood in the cellular telecommunication area, each individual BTS 134 of the group of BTSs under the control of the respective BSC 132 defines a radio cell operating on a set of radio channels, thereby providing service to a plurality of Mobile Stations (MSs) in the immediate vicinity, a representative one of which is illustrated and designated by the reference numeral 140. Although the specific network architecture and nomenclature depicted and described in FIG. 1 may vary depending upon the particular digital mobile communications system employed, the illustrated configuration may be equivalently implemented on a number of digital mobile communications systems, e.g., CDMA, a Digital Advanced Mobile Phone System (D-AMPS), PDC, GSM, etc. It is also understood that a number of discrete BSSs 130 are controlled by a single MSC 122, although only one BSS 130 is shown in FIG. 1.

As noted, MSC 122 controls, in general, a number of BTSs 134. The MSC 122 also controls calls to and from other telephony and data communication systems, e.g., a Public Switched Telephone Network (PSTN) 150 and an Integrated Services Digital Network (ISDN) 155. When a user subscribes to a service, the subscription information, e.g., supplementary services and authentication parameters, is stored within the HLR database 124. Furthermore, dynamic information relating to the location of a particular subscriber MS 140 is also within the HLR 124. This information, of course, changes as the subscriber moves about the telecommunication network. The AUC 125 is coupled to the HLR 124 and functions to provide the HLR 124 with authentication parameters and ciphering keys, both utilized for providing various modes of security.

The VLR 123 is also a database containing information about all the respective MSs 140 currently located in the area serviced by that particular MSC 122. When an MS 140 roams into a new MSC/VLR area, the VLR 123 associated with that MSC 122 requests data about the roaming MS 140 from the respective HLR 124 servicing the roaming MS 140. Concurrently, the HLR 124 is informed about the particular MSC area within which the MS currently resides. As is understood in the art, the VLR 123 also contains more precise location information regarding a roamed MS than does the respective HLR 124. The EIR 126, a GSM component, contains the unique hardware identity of all the mobile equipment and is connected to the MSC 122 over a signaling link, which enables the MSC 122 to verify the validity of any equipment attempting to access the system 100. It is additionally understood that the EIR 126 may be integrated with the AUC 125 as a single unit, as in GSM.

The other-GSM-related component is the GIWU 128, which in telecommunication system 100 provides various data services, e.g., facsimile, data circuit asynchronous services, data circuit synchronous services, unrestricted digital information towards ISDN, and alternate speech/fax, to a number of MSs 140. Although connections in the telecommunications system 100 shown in FIG. 1 are circuit-switched, packet services, e.g., Internet access, are not precluded, e.g., the current cdma2000 packet data architecture permits both circuit-switched and packet-switched communications, although the paradigm is in need of improvement, as set forth herein. With reference again to FIG. 1, in order to access a packet-switched public data network (PSPDN) 160 in telecommunications network 100, a connection to a Packet/Assembly Disassembly (PAD) 165 unit is made to transform the bit stream from an asynchronous terminal, e.g., voice, to data packets in conjunction with performance of the required service by the GIWU 128. In this scenario, routing may take place through the PSTN 150, the ISDN 155, or through other external telephony or data networks, as well as the MSC 122, as is understood in the art.

The present invention, described in more detail hereinbelow not only provides an improved all-packetized communications paradigm, i.e., an "all-IP" telecommunications network, but the basic infrastructure thereof is conducive to facilitating the migration from current CDMA network infrastructures, particularly, the flawed configuration of the current cdma2000 protocol, as discussed hereinabove in connection with FIG. 1, to the preferred packetized network configurations described further herein. Thus, network operators can gradually upgrade a conventional network to the network taught by the present invention rather than fully implementing a new infrastructure at once, thereby facilitating implementation of new with legacy structures.

As should be apparent from the aforedescribed conventional system shown in FIG. 1, the MSC 122, or an equivalent thereof, must be invoked when setting up a packet data session in the conventional system, and thus an MSC is currently necessary in a packet data network configuration. However, Applicants have learned an improved technique for decoupling the MSC functionality, i.e., separating the voice and data service functionality into discrete nodes, which facilitates implementation of the methodologies of the present invention. Accordingly, an access control node is introduced herein for performing this function, i.e., providing a separate entity for handling data services (as well as speech over data services), thereby freeing the MSC for conventional, circuit-switched voice call services.

Figure 2:
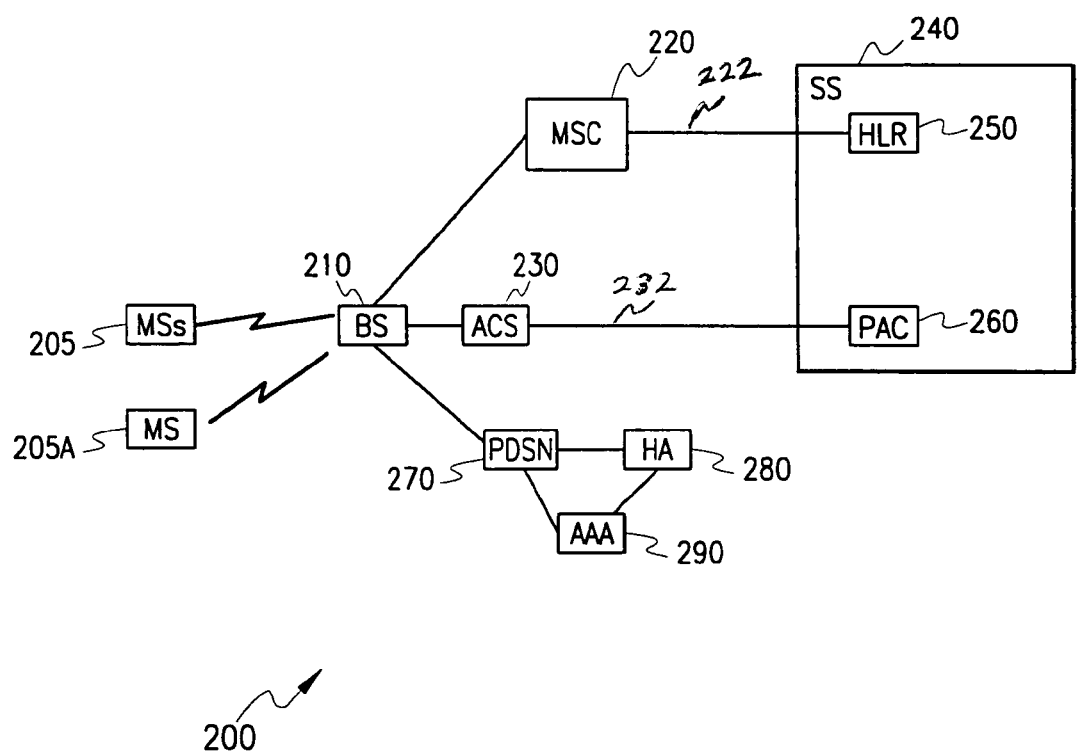
FIG. 2 depicts a general packet data service configuration pursuant to the teachings of the present invention, illustrating an Access Control Server being used in conjunction with a Mobile Services Switching Center.

With reference now to FIG. 2 of the present invention, there is illustrated a preferred packet data service configuration, generally designated by the reference numeral 200, in accordance with the teachings of the present invention. As illustrated, an MS 205 communicates with a BS 210 across a radio air interface, e.g., using CDMA transmissions. Whereas the BTS 134 (and BSC 132) in FIG. 1 were connected directly to the associated MSC 120, channeling all communications, whether voice or data, therethrough, the functionality of an MSC 220 in the packet data service configuration 200 of FIG. 2 is subject to functional decoupling to improve data throughout and overall efficiency. In other words, pursuant to the advances set forth in the present invention, MSC 220 preferably handles the various circuit-switched voice services in a conventional manner, and the various data services are instead handled by an Access Control Server (ACS) 230.

As discussed, one goal of the present invention is to facilitate migration from the conventional telecommunications system 100, as shown in FIG. 1, to an improved configuration to enhance data communications and described herein as an all-IP network. During this paradigmatic transition a mixture of legacy mobile stations 205A and all-IP mobile stations 205 will communicate with the BS 210. Accordingly, the ACS 230 preferably serves both packetized voice and data connections. The implementation shown in FIG. 2 is in parallel with the MSC 220, where initially the ACS 230 may handle all of the burgeoning data service connections while the MSC 220 continues to handle the voice connections. Naturally, over time the ACS 230 may handle all packet and voice over packet connections, permitting a gradual phasing out of MSC functionality, thereby enhancing the viability of the present paradigm over more disruptive approaches. Nonetheless, the illustrative example shows data-only sessions operating independently from the MSC 220 by the ACS 230.

With reference again to FIG. 2, both the MSC 220 and the ACS 230 are in contact with a Switching System (SS) 240. In particular, the MSC 220 communicates with an HLR 250 therein across an interface 222 in the manner described in connection with FIG. 1, and the ACS 230 communicates with a Packet Authentication Center (PAC) 260, which provides the analogous services of an HLR to the ACS 230 albeit directed to connectionless, packet sessions. In other words, the PAC 260 contains various subscriber profiles therein for authentication and authorization of packet data. It should be understood that the functionalities of the HLR 250 and PAC 260 could be integrated into one SS 240 entity, e.g., a Packet HLR. Interface 232 between the ACS 230 and the PAC 260 is preferably an open IP-based interface designed on Internet Engineering Task Force (IETF) protocols.

Additional components of the packet data service system 200 include a target Packet Data Service Network (PDSN) 270, a Home Agent (HA) 280 and an Authorization, Authentication and Account node (AAA) 290, each of which operate independently, as is understood in the art.

Figure 3:
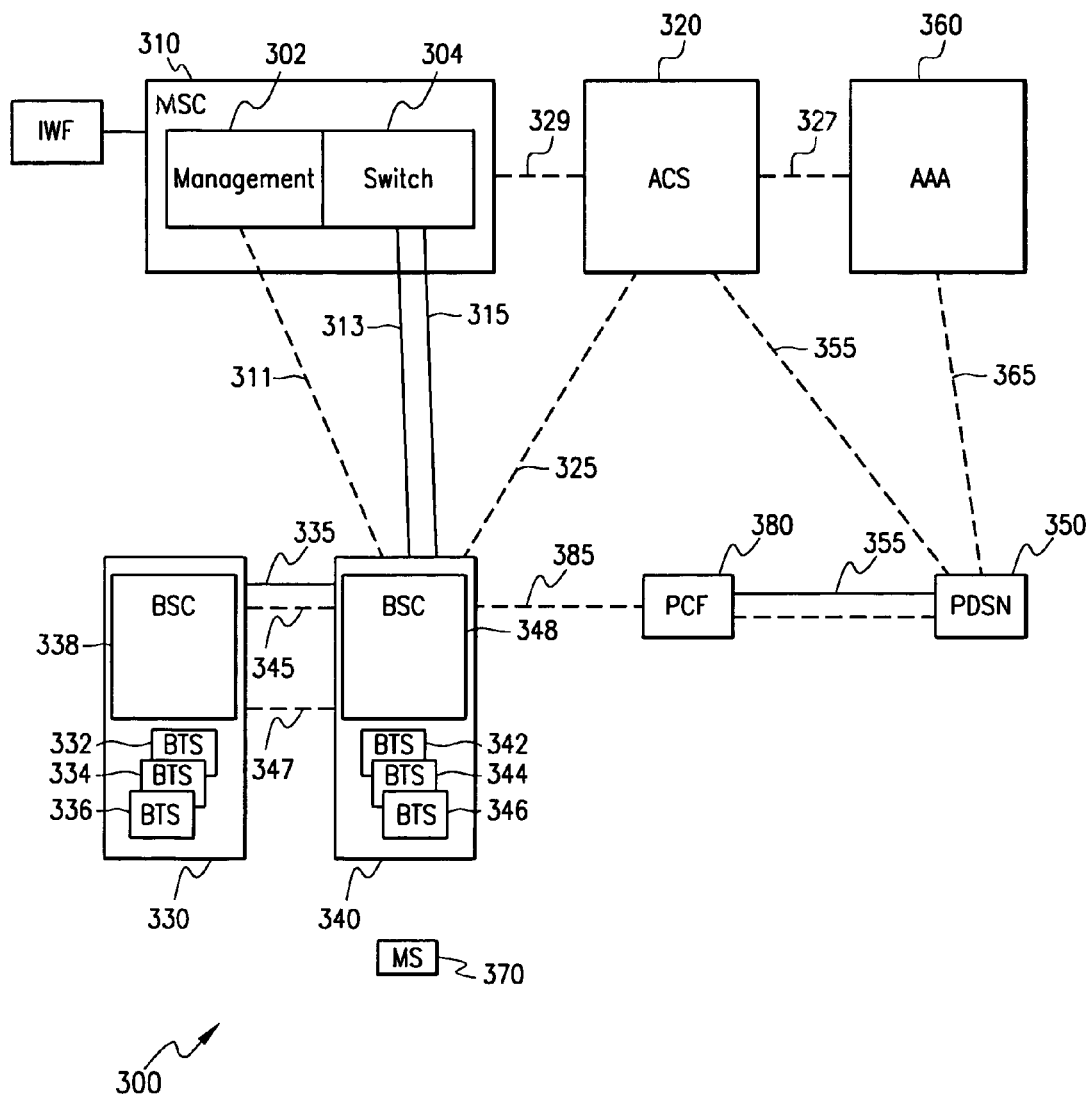
FIG. 3 depicts the packet data service configuration of FIG. 2 in more detail, illustrating various linkages of the components pursuant to a preferred embodiment of the present invention.

One technique for the extrication of data services from the MSC 220, as accomplished in a preferred embodiment of the present invention, may be better understood with reference to FIG. 3, illustrating in more detail the ACS and MSC linkages within a preferred packet data service configuration, generally designated therein by the reference numeral 300, where dashed lines in the figure indicate signaling links and solid lines indicate user traffic, e.g., payload. As shown in FIG. 3, packet data service configuration 300 includes an MSC 310, an ASC 320, a target BSS 330 and a source BSS 340.

MSC 310 generally includes a management unit 302 and a switching system 304 therein for managing the provisions of cellular service. It should be understood that while the switching system 304 is illustrated in FIG. 3 as a single component, switching system 304 may instead be a multi-component system having numerous subsystems for interfacing and routing to various network layers, e.g., switching system 304 commonly includes the following capabilities: a common channel signaling subsystem for signaling, routing, and supervision of messages transfers in accordance with signaling protocols, e.g., Signaling System 7 (SS7) protocols; a group switching subsystem for selection, connection and disconnection of speech and/or signaling paths through the group switch; traffic control subsystem for providing supervision and clearing of calls, selection of outgoing routes and analysis of incoming digits for proper incoming routing; traffic control subsystem for providing connection to other devices or nodes and providing the signaling channel; and operations and maintenance subsystem for providing maintenance to, for example, trunk circuits, test-line signaling, and other various subsystems.

It should also be understood that the individual subsystems of the switching system 304 can be composed of hardware or software, e.g., the traffic control subsystem, or a combination of both, e.g., the trunk and signaling subsystem. It should also be understood that the management unit 302 is generally composed of various individual subsystems, each likewise composed of software, hardware or a combination of the two.

With reference again to FIG. 3, target BSS 330 includes a group of BTSs, e.g., BTSs 332, 334 and 336, and an associated BSC 338 controlling the group. Similarly, source BSS 340 includes another group of BTSs, e.g., BTSs 342, 344 and 346, and an associated BSC 348 controlling that group. As is understood in the art, the two BSSs 330 and 340 communicate via various links, e.g., a user interface 335 and signaling interfaces 345 and 347. Similarly, BSS 340 interfaces with the MSC 310 over a signaling interface 311 for call management signaling and interfaces 312 and 315 with the switching system 304.

As discussed hereinbefore, the most noticeable departure from the prior art is the inclusion of the ACS 320 within the packet data service configuration 300. As shown in FIG. 3, ACS 320 interfaces with BSS 340 over an interface 325, the purpose of which is to allow packet data servicing independent of the MSC 310. In this regard, ACS 320 provides the traditional MSC services in a packet-data-only scenario, thereby relieving the MSC 310 from providing packet data servicing duties. In a preferred embodiment of the present invention, interface 325 is an IP transmission medium supporting American National Standards Institute (ANSI) signaling. In other words, interface 325 enables the ACS 320 to be regarded as a signaling server for packet data, and the interface 325 is preferably capable of carrying ANSI-41 signaling, i.e., ANSI-41-over-IP.

With reference again to FIG. 3, ACS 320 interfaces with a packet data services network (PDSN) 350 over an interface 355, indicating that the ACS 320 is preferably responsible for the particular PDSN 350 selection, i.e., the ACS 320 provides the ultimate packet target routing. However, as is understood in the art, interface 355 may be eliminated if the PDSN 350 selection is provided through another entity. Via an interface 327, legacy ANSI messaging between the ACS 320 and an Authentication, Authorization and Accounting (AAA) 360 unit is made possible. The AAA 360 thus provides the call authentication and authorization for packet data sessions analogous to the HLR 124, AUC 125 and EIR 126 functions for pre-call set-up function for voice and data authentication and authorization services provided in the prior art.

With reference again to FIG. 3, yet another interface 365 enables signaling communications between the PDSN 350 and AAA 360, as is already known in prior art CDMA networks, particularly, the aforementioned cdma2000 configuration. Preferably, the signaling between the ACS 320 and AAA 360, i.e., across interface 327, is similar to the signaling between the PDSN 350 and the AAA 360 across interface 365. Additionally, a so-called migratory interface 329, if needed, could enable synchronization between the MSC 310 and the ACS 320, e.g., for provisioning of dual transmission mode services to mobile stations 370 requesting both legacy services, e.g., circuit-switched voice, and packet data network access, particularly for VLR 123 capabilities. It should, of course, be understood that interface 329, even if initially needed, would be rendered unnecessary after the network 300 has been fully converted to an all-IP access network, e.g., when all of the MSs 370 serving the system 300 are all-IP.

With further reference to FIG. 3, the PDSN 350 could be in communication with the BS 340 via a Packet Control Function 380, e.g., over interfaces 355 and 385, respectively.

Figure 4:
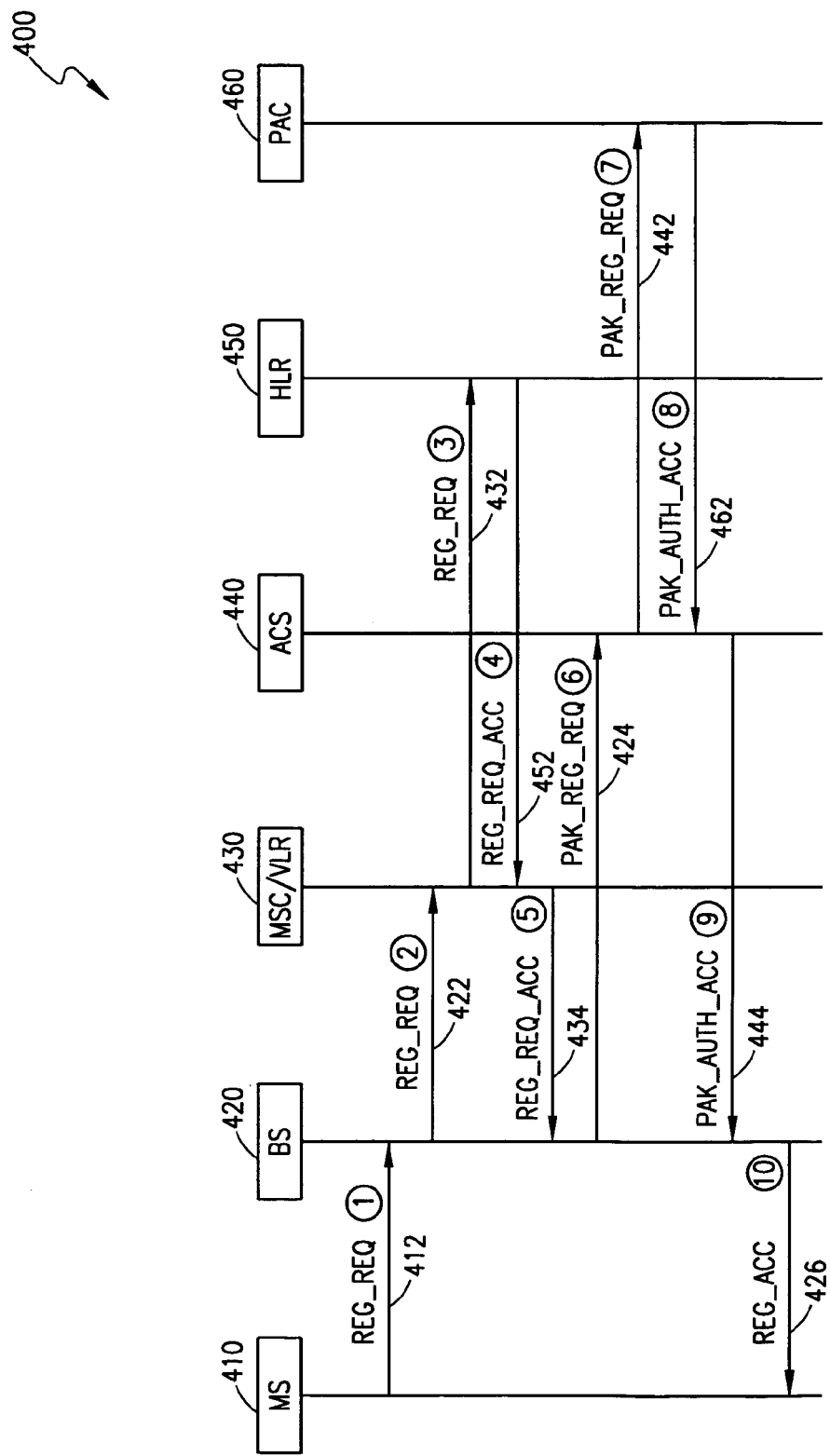
FIG. 4 depicts a signal flow methodology for the registration of a mobile station within a packet data network of the present invention.
Figure 5:
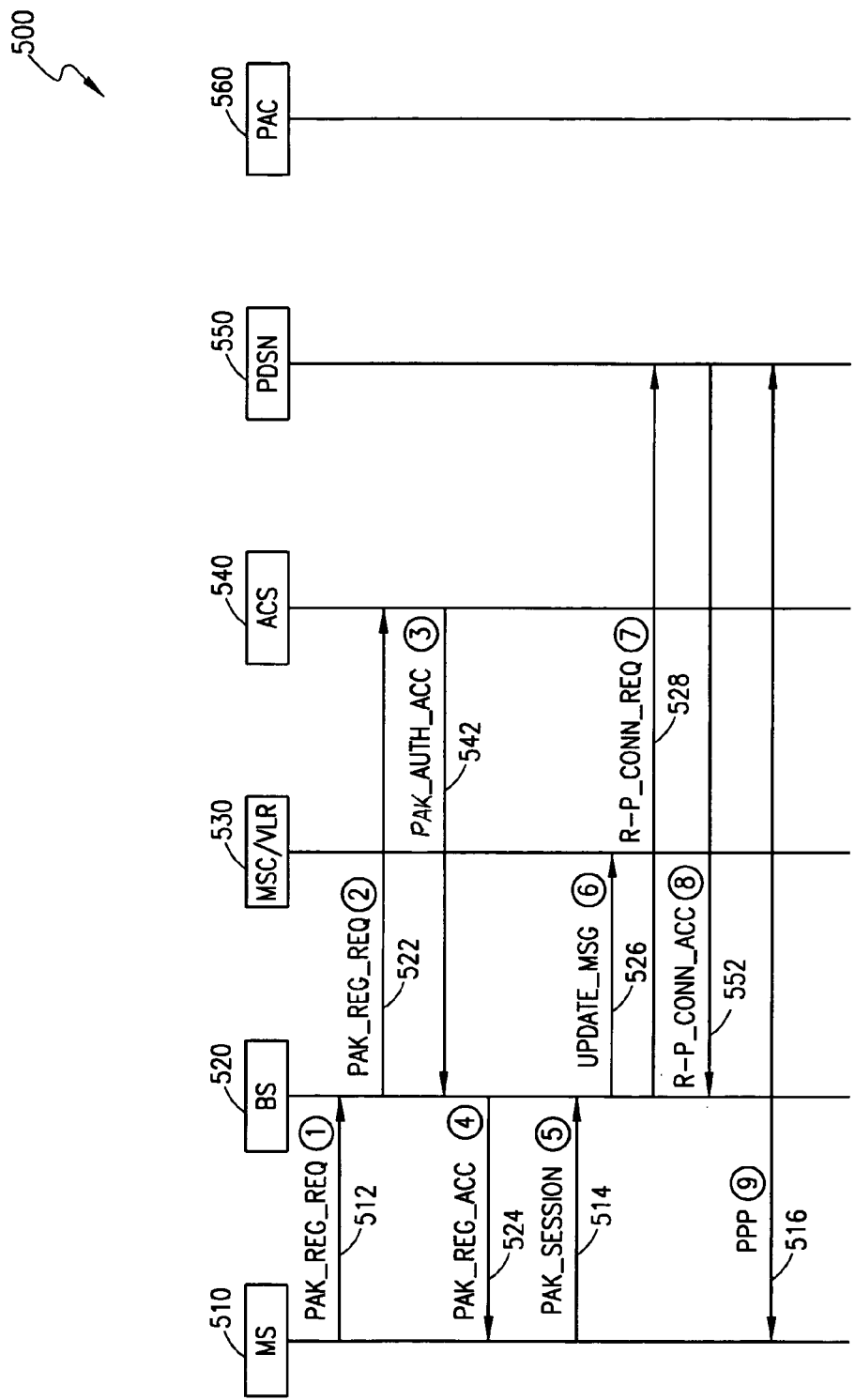
FIG. 5 depicts a signal flow methodology for setting up a packet session within a packet data network pursuant to the teachings of the present invention.
Figure 6:
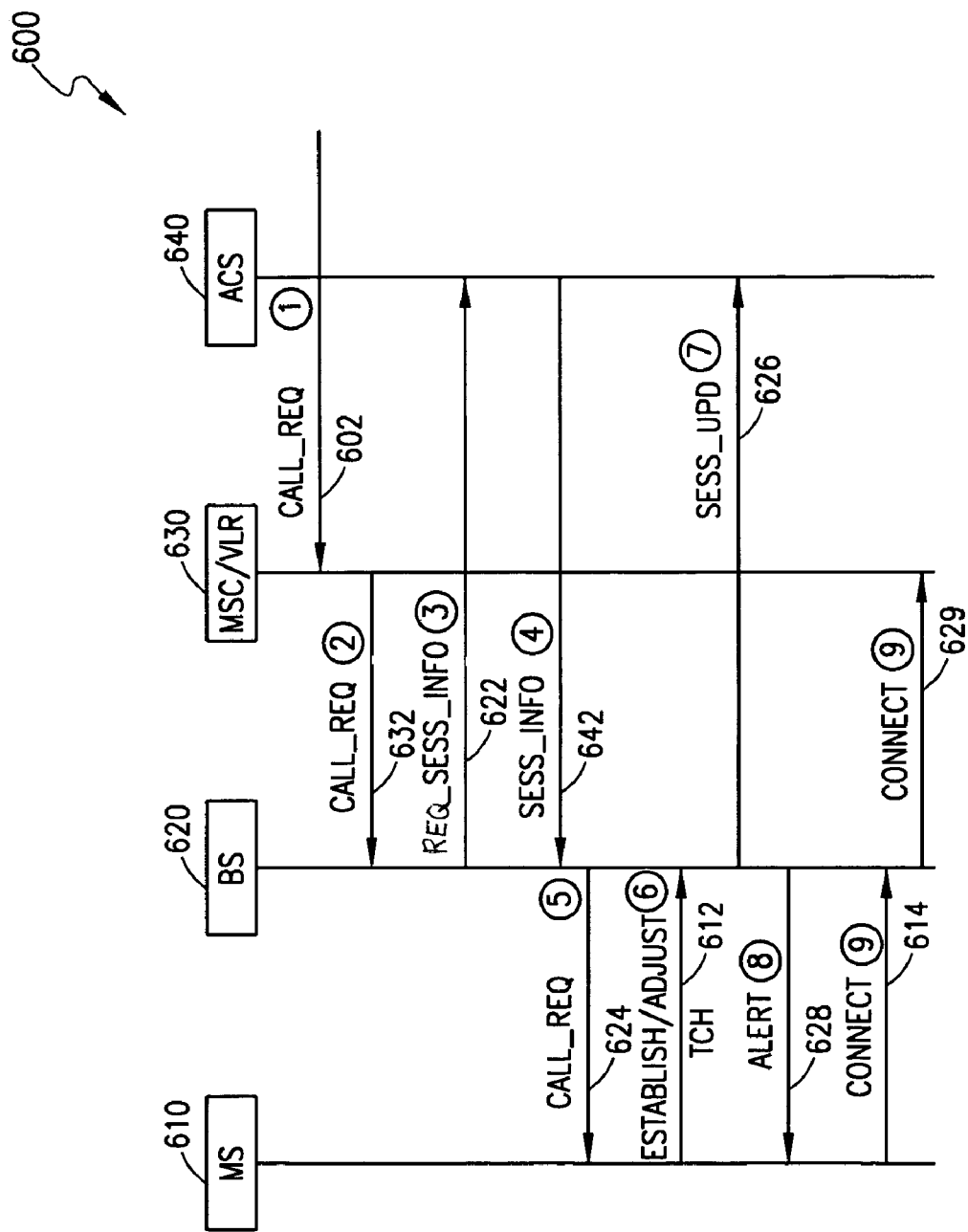
FIG. 6 depicts a signal flow methodology for handling an active incoming call, particularly a call having high data rate or other enhanced bandwidth capabilities, in a packet data network of the present invention.
Figure 7:
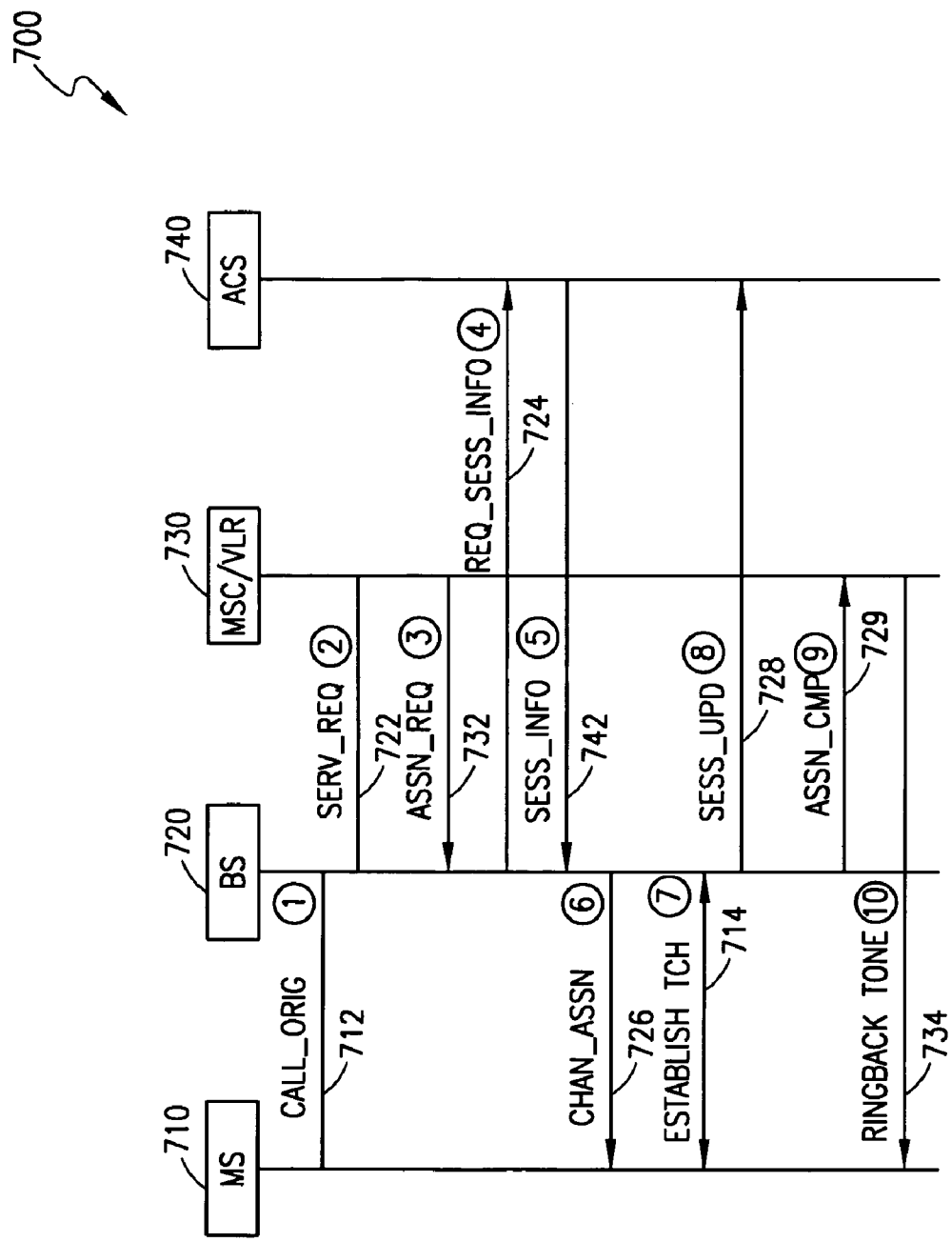
FIG. 7 depicts a signal flow methodology for handling a mobile-originated call, particularly a call having enhanced bandwidth capacities, within a packet data network of the present invention.

The signaling flow methodology for a variety of capabilities of the present invention are illustrated in FIGS. 4–7. In particular, the signaling flow for registration (regardless of where camping) is shown in FIG. 4. A packet session setup pursuant to the teachings of the present invention is demonstrated in FIG. 5. Handling an active incoming call employing High Data Rate (HDR) or other enhanced bandwidth capabilities is illustrated in FIG. 6. Finally, the handling of a mobile-originated call employing the HDR or other enhanced bandwidth capabilities is shown in FIG. 7.

With reference again to FIG. 4, there is illustrated a registration chronology for a mobile station 410, as executed in a preferred embodiment of a migratory-phase or transitional network 400, pursuant to the teachings of the present invention. As shown in FIG. 4, a user requiring a service makes a registration request (REG_REQ) 412, which is transmitted from the MS 410 to an associated BS 420 currently providing radio coverage to the MS 410 (step 1). Preferably, the REG_REQ 412 includes voice-specific and/or packet-specific request parameters, along with voice/packet common parameters. The BS 420 then forwards the REG_REQ 412, now designated as REG_REQ 422, to the controlling MSC/VLR 430 entity (step 2). The visitor location register portion of the MSC/VLR 430 is then interrogated for the identity of a requesting home location register 450 associated with the MS 410. This information, as is understood, is updated each time an MS 410 moves into a different MSC/VLR 430 coverage area.

The MSC/VLR 430 forwards the received REG_REQ 422, now designated as REG_REQ 432, to the aforedescribed home location register 450 of the MS 410 (step 3). Assuming the requesting MS 410 and the requested service are approved after HLR 450 interrogation, a registration request acceptance (REG_REQ_ACC) 452 is forwarded from the HLR 450 back to the servicing MSC/VLR 430 (step 4), which in turn forwards the REG_REQ_ACC, now designated as REG_REQ_ACC 434, to the BS 420 providing coverage to the MS 410 requesting service (step 5).

For the subject illustrative example, it is assumed that the MS 410 is requesting a packet data service and, accordingly, the BS 420 next sends a packet registration request (PAK_REG_REQ) 424 to an ACS 440 (step 6). As described hereinabove, the ACS 440 is an IP-only entity, i.e., entirely packetized, and is, accordingly, involved only in servicing packet data requests. Thus, had the MS 410 in the current example made a circuit-switched request, e.g., voice only, the ACS 440 would not be involved in servicing this request.

It is further understood that this scenario best illustrates the migratory phase of the preferable network, i.e., the network is supporting both circuit-switched services and packet data services, in which, ultimately, the ACS 440 would handle all data and voice over data requests when both are implemented fully by IP, as will be described more fully hereinbelow with reference to FIG. 8. It is further noted that, in the event of both a circuit-switched and packet request by the MS 410, e.g., a voice and data call, steps 2 through 3 could be executed in parallel with step 6, i.e., while the MSC/VLR 430 and HLR 450 are being interrogated and responding for set-up of a circuit-switched call, the ACS 440 and a PAC 460 could simultaneously be interrogated and respond for setting up the packet data service portion of the call (steps 6–9). Accordingly, it should be understood to one skilled in the art that steps 2–5 are practiced only if CS-related services are requested, steps 6–9 if PS-related services only, and steps 2–9 only if both CS- and PS-related services are requested.

With reference again to FIG. 4, once the ACS 440 receives the PAK_REG_REQ 424, it forwards the registration request, now designated as PAK_REG_REQ 442, to the packet authentication center 460 (step 7). Assuming the MS 410 and the requested packet service are authorized, PAC 460 responds by sending a packet authentication acceptance (PAK_AUTH_ACC) 462 message back to the ACS 440 (step 8), which forwards the acceptance message, now designated as PAK_AUTH_ACC 444, to the servicing BS 420 (step 9). A registration acceptance message (REG_ACC) 426 is then sent to the MS 410 in a final registration step (step 10).

Since the exemplary transitional network will suitably handle MSs requesting both circuit-switched servicing and the packet servicing requests from more modern, all-packetized communication MSs, it is advantageous for the packet request signaling between the network and the disparate terminating equipment to reuse any signaling formatting that can commonly be utilized for both circuit-switched and packet servicing requests. Thus, the REG_REQ message, as discussed hereinabove, preferably includes common parameters that are required for both circuit-switched registrations and packet session registrations, e.g., mobile identifiers, etc., and uncommon parameters relating to the particular service, i.e., voice specific and packet specific registration parameters.

With reference now to FIG. 5, there is illustrated a methodology for requesting and setting up a packet data session with a packet data service network, generally designated in the figure by the reference numeral 500. A mobile station 510 in network 500 first sends a packet session registration request (PAK_REG_REQ) 512 to a servicing BS 520 (step 1), which forwards the registration request, now designated as PAK REG_REQ 522, to an ACS 540 (step 2). The ACS 540 authorizes the requested session based on a stored profile of the user, including a service profile of subscribed packet services. Assuming a successful authorization by the ACS 540, a packet authentication acceptance (PAK_AUTH_ACC) 542 is returned to the servicing BS 520 (step 3), which informs the MS 510, via a PAK_REG_ACC 524, of the registration acceptance (step 4).

Upon registration acceptance, a radio access packet service connection (PAK_SESSION) 514 is then allocated within the network 500 by establishment of a traffic channel between the MS 510 and the servicing BS 520 (step 5). An MSC/VLR 530 is next notified of the active packet service by an update message (UPDATE_MSG) 526 transmitted from the BS 520 (step 6), updating the status of the MS 510 stored therein accordingly. A Radio network-Packet Network (R-P) connection request (R-P_CONN_REQ) 528 is next made between the servicing BS 520 and a PDSN 550 (step 7), from which an R-P connection acceptance message (R-P_CONN_ACC) 552 is returned to the BS 520 (step 8). The packet session is finally completed by a point-to-point protocol (PPP) session 516 between the MS 510 and the PDSN 550, and includes a dynamic mobile IP registration with the packet data service network (step 9). Equivalently, a high-level data link control (HDLC) general purpose data link may be established in place of the illustrative PPP session 516.

It should be understood that an R-P session is a logical connection established over the R-P interface for a particular PPP session. If a user changes radio networks (RNs) during packet data service, the R-P session is moved from the old RN to the new RN (still connected to the same PDSN). If the user changes PDSNs during packet data service, a new R-P session is established and the previous R-P session is released.

With reference again to FIG. 6, there is illustrated a procedure for handling an incoming call request to an active mobile station, for example, in a high data rate (HDR) or other enhanced bandwidth capacity session within a packet data services network 600, as also described and illustrated according to the example described hereinabove with reference to FIG. 5. An incoming call request (CALL_REQ) 602 directed to an MS 610 is routed to the currently servicing MSC/VLR 620 from a calling party (step 1). It should, of course, be understood that the incoming call may originate from within the mobile network 600, an external mobile network, a public switched telephone network, or any other telecommunications entity, as is understood in the art. With reference again to FIG. 6, when the MSC/VLR 630 receives the CALL_REQ 602, the updated record of the terminating MS 610 is retrieved. In the illustrative example, since the MS 610 is already active in a call session, e.g., a high data rate (HDR) or other enhanced bandwidth capacity packet session, a traffic channel is already established between the MS 610 and the radio network, and, thus, the MSC/VLR 630 does not have to page the MS 610. Accordingly, a CALL_REQ 632 is forwarded from the MSC/VLR 630 to the servicing BS 620 (step 2). The servicing BS 620, in turn, queries an ACS 640 with a session request (REQ_SESS_INFO) 622 to determine the MS 610 profile (step 3), e.g., to determine how the active packet session is treated.

After analyzing the MS 610 profile stored therein, the ACS 640 forwards the session information (SESS_INFO) 642 to the servicing BS 620 (step 4), thereby instructing the BS 620 on proper call treatment, e.g., idling the high data rate session, setting up a separate traffic channel for active voice and data, multiplexing data and voice, etc. Next, the MS 610 is informed by the BS 620 of the call request (CALL-REQ), now designated as CALL_REQ 624 (step 5), at which point the MS 610 responds accordingly (step 6), e.g., establishing additional traffic channels, adjusting the active traffic channel, etc., with an ESTABLISH/ADJUST signal 612.

In the illustrative example, it will be assumed that the MS 610 can only support one active session and that the incoming voice call has priority of the existing packet session. Thus, the traffic channel is switched from a high data rate or other like high capacity bandwidth packet session to a voice session. When the switch is complete, a session update (SESS_UPD) 626 message is transmitted from the BS 620 to the ACS 640 in order for the MS 610 record to be updated (step 7), e.g., to instruct the ACS 640 to halt mapping data in the packet session. The MS 610 is then alerted by the BS 620 with an ALERT signal 628 (step 8) as to the changes in the current session, at which point the voice call is completed and the connections made (CONNECT 614 and 629) to the MSC/VLR 630 in the typical manner (step 9).

With reference again to FIG. 7, there is illustrated a procedure for handling an outgoing call request from a mobile station 710 already active, for example, in a high data rate or other high bandwidth capacity session with, a packet data services network 700, as also described and illustrated hereinabove with reference to FIGS. 5 and 6. The MS 710 first sends a call origination request (CALL_ORIG) 712 when attempting to place a call to a servicing BS 720 (step 1). The BS 720 then transmits a service request (SERV_REQ) 722 to a controlling MSC/VLR 730 responsible for handling the circuit-switched operations of the transitional network 700 illustrated. An assignment request (ASSN_REQ) 732 is, accordingly, transmitted from the MSC/VLR 730 back to the servicing BS 720 (step 3).

Since a packet data session is already active in the illustrative example, an ACS 740 must be queried for appropriate treatment of the ongoing session. This is executed by sending a request for session information (REQ_SESS_INFO) 724 message to the ACS 740 (step 4). The ACS 740 then queries the user profile associated with MS 710 stored therein, retrieves the relevant user profile information, identified in the figure as SESS_INFO 742, and forwards the appropriate SESS_INFO 742 information back to the servicing BS 720 (step 5). This information is used by the radio network to determine the appropriate handling procedures in view of the applicable service options associated with the MS 710. A channel assignment (CHAN_ASSN) 726 is then submitted to the MS 710 (step 6), which establishes a traffic channel, (ESTABLISH TCH) 714, or adjusts the previously established traffic channel, according to the relevant service options (step 7). When the traffic channel set-up is complete, the ACS 740 is then notified by the BS 720 of the changes in the session conditions by a session update (SESS_UPD) 728 message (step 8), which accordingly modifies the user profile associated with the MS 710. Thereafter, or concurrently with transmission of the SESS_UPD 728 message, the MSC/VLR 730 is notified of the assignment completion (step 9), e.g., by an ASSN_CMP signal 729, at which point a ringback tone 734 is submitted to the MS 710.

As described hereinabove, the ACS 740 is responsible for the proper handling of packet data sessions in the transitional network of a preferred embodiment of the present invention. As such, the ACS 740 is responsible for bearer control and mobility management associated with packet services, e.g., access to packet service data networks, and authorizes all user requests for such services. The ACS 740 maintains and updates the subscriber packet service subscription profile, as well as actual packet session characteristics, which are generally dynamic and vary depending on the available radio resources, roaming behavior between different carriers, etc.

The ACS 740, as also set forth in more detail hereinabove, preferably maintains an open IP-based IETF protocol with a base station 720 providing services to the respective MS 710. The MSC/VLR 730 maintains control and handling procedures for all circuit-switched services during the transition from a mixed circuit-switched and packet-switched network 700. This allows for independent transition of voice-to-IP and packet-to-IP, with the migration ultimately culminating in an all-IP radio access network (RAN).

It should be noted that while the ACS 740 is responsible for packet session servicing in the aforedescribed FIGS. 4–7, mobile stations not supporting IP could still access packet services as traditionally executed over an asynchronous radio link, i.e., by way of the GIWU 128 operating in coordination with an MSC/VLR and a PAD unit 165, as shown and described in connection with FIG. 1, operating to intermediate between the radio access network and the public switched packet data network 160

Figure 8:
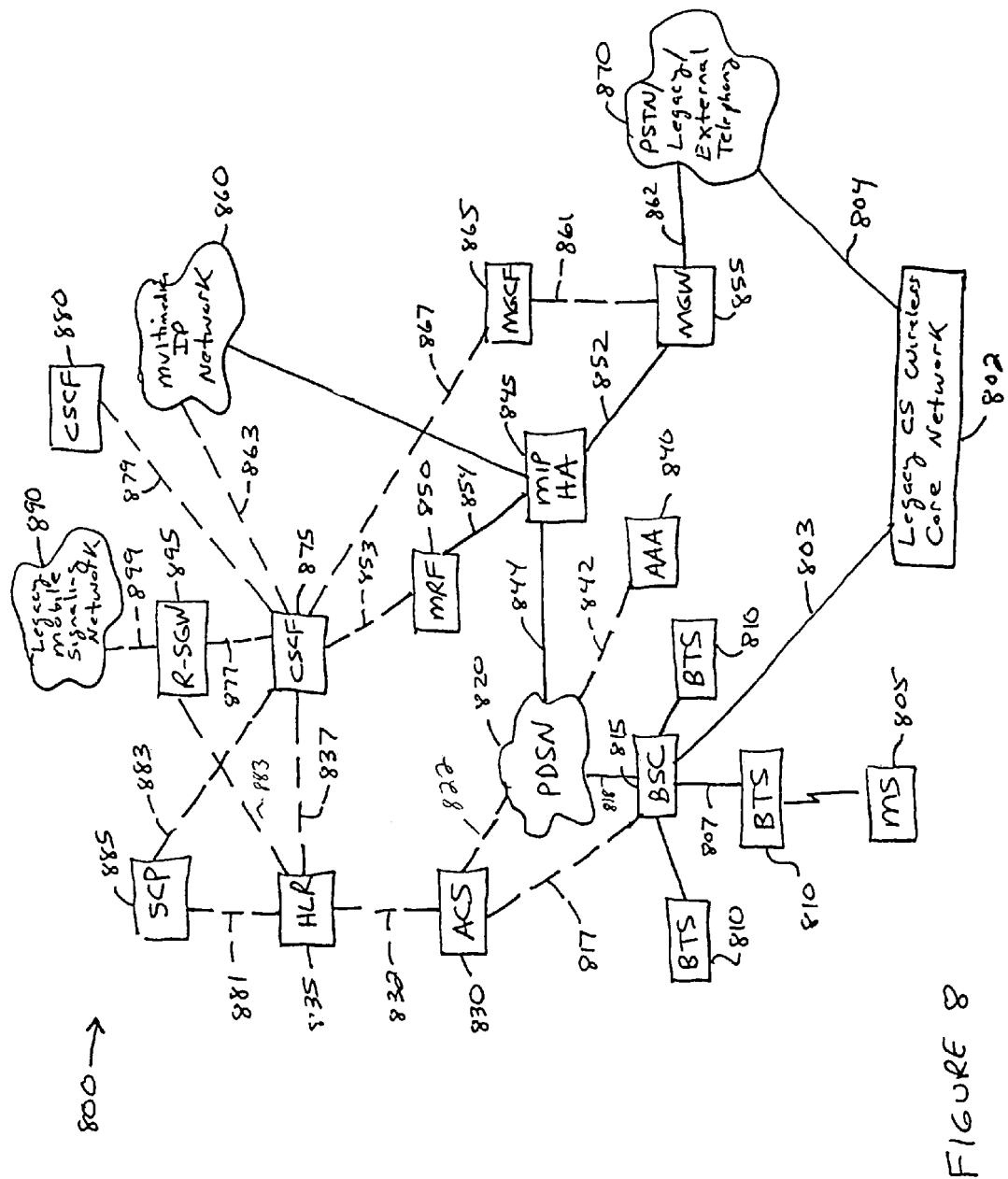
FIG. 8 depicts an improved packet data network configuration offering an IP-based architecture for the transition to IP-based protocols pursuant to the teachings of the present invention.

With reference now to FIG. 8, a preferred embodiment of an all-IP radio access network, generally designated therein by the reference numeral 800, is illustrated, dashed lines indicating dedicated signaling interfaces and solid lines indicating data transfer and signaling interfaces. As discussed hereinabove, network 800 is preferably an improvement or enhancement of that currently identified as cdma2000, and is thus preferably an improved CDMA configuration. It should, nonetheless, be understood that the principles of the present invention may also be applied within a variety of telecommunications systems and networks, whether CDMA-based or otherwise.

As shown in FIG. 8, a number of mobile stations MSs 805 (only one of which is shown for simplicity) communicate with the improved telecommunications network 800 using all-packetized, i.e., all-IP, protocols, e.g., transceiving code division modulated communications, as is understood in the art. In particular, MS 805 wirelessly communicates with one of many BTSs 810, each controlled and communicating with a BSC 815 over data and signaling interfaces 807, which provide the terminating terrestrial links to the radio access part of the network 800. The BSC 815 is controlled by an ACS 830 entity having the aforedescribed control functions. Additionally, in the preferred embodiment, the circuit-switched services have been replaced by equivalent IP-based services. Thus, the ACS 830 not only controls packet data requests, but also voice requests provided by IP in the exemplary embodiment, thereby alleviating the need for an MSC in the inventive network 800. It is also understood that the ACS 830, in general, will command a plurality of BSCs 815 with each additional BSC 815 having a corresponding plurality of BTSs 810 associated therewith, although only one such BSC is described in the illustrative example.

The ACS 830 interfaces with the BSC 815 over a signaling link 817 for bearer control and mobility management signaling transmissions therebetween. The ACS 830 also has a signaling 9 interface 832 for communications, e.g., user profile interrogations, with an HLR 835, e.g., a packetized HLR, and a signaling link 822 interfacing with a packet data services network (PDSN) 820 for coordinating mobile connections thereto. Similarly, PDSN 820 is provided with a signaling interface 842 with an Authentication, Authorization and Accounting (AAA) unit 840, for account authorization, equipment authentication, account metering, etc., by the ACS 830 across respective signaling links 822 and 842. As discussed, the ACS 830 may be provided with a direct signaling link with the AAA 840, e.g., the ASC-AAA interface 327 as described hereinabove in connection with FIG. 3.

BSC 815 is linked with the PDSN 820 by a signaling and data link 818, preferably embodied as an R-P communication link, as described in more detail hereinbefore. The PDSN 820 provides access to a mobile IP home agent (MIP HA) 845 by a signaling and data link 844. The MIP HA 845 provides a communication medium towards a PSTN 870 and is interfaced to a media gateway (MGW) 855 therebetween by a signaling and data interface 852. The MGW 855 interfaces to external telephony networks, e.g., the PSTN/Legacy networks 870 across a signaling and data interface 862. For proper routing of information at the MGW 855 to and from the PSTN/Legacy network 870, a media gateway control function (MGCF) 865 unit is provided with a signaling interface 861 to the MGW 855. The MGCF 865 also interfaces to a call state control function (CSCF) 875 across a signaling interface 867, which can itself exchange signaling with the HLR 835, e.g., across a link 837.

MIP HA 845 also has payload exchange capacity with a multimedia resource function (MRF) 850 provided by a data and signaling interface 854. Call state functions are forwarded by the CSCF 875 to the MRF 850 via a signaling interface 853.

CSCF 875 may also interface with a multimedia IP network 860 across a signaling interface 863 for supporting multimedia IP payload accessed via MIP HA 845. As is understood by one skilled in the art, there is no need for a gateway or a gateway control functioning unit for interfacing to the network 860 since the radio access network 800 and the network 860 commonly share IP transmissions.

CSCF 875 also preferably interfaces with a roaming signaling gateway R-SGW 895 over a signaling interface 877 for supporting roaming to a legacy mobile system, e.g., a circuit-switched public land mobile network. Thus, R-SGW 895 interfaces with a signaling network, e.g., a legacy mobile signaling network 890, of a circuit-switched mobile network across a signaling interface 899. R-SGW 895, therefore, interfaces to the HLR 835 for subscriber profile updating when an MS 805 roams from network 800 by way of the signaling interface 837.

Access to external, non-IP applications and services may be had by providing communication interfaces 881 and 883 with a service control point (SCP) 885, respectively coupled to the HLR 835 and the CSCF 875, for providing call state and account information for coordinating access to the external services.

With further reference to FIG. 8, the preferred all-IP CDMA network 800 also eliminates the need for a PAC 260, as illustrated and discussed in connection with FIG. 2, Finally, a general CSCF 880 may interface with the first CSCF 875 via a signaling interface 879.

With further reference to FIG. 8, whereas the above description and configuration is illustrative of the end product of an all packetized network, during the transition from CS-based configurations connection may still be had to legacy devices, e.g., via a Legacy CS Wireless Care Network 802. As shown in the figure, the network 802 may communicate with the BSC 815 across a signaling end date transfer interface 803, and with the PSTN 870 across a signaling and data transfer interface 804.

As discussed and described hereinabove, the problem of the prior art in making the transition from legacy, circuit-switched architectures to packet-switched configurations, particularly, within the cdma2000 standard, is inherent, built-in structural flaws in the architecture paradigm. Reliance on MSC functionality by the industry in evolving architectures results in complicated topologies and inefficient usage of system resources. By de-coupling the functionalities, an improved configuration is made possible, as well as a methodology for the migration of current systems, such as those adhering to the cdma2000 protocols, to the marked improvements of the system and methodology of the present invention.

With reference now to FIGS. 9A–9E there is illustrated a logical overview of the evolution or migration from a conventional, tightly-bundled network, such as exemplified by cdma2000, to an entirely packetized, all-IP network. A proposed stepwise migration starts in FIG. 9A from a conventional configuration illustrating a radio access network (RAN) 910A serviced by legacy circuit-switched functionalities and by packet-switched functionalities, designated in the figure by the reference numerals 920A and 930A, respectively. As illustrated in FIG. 9A by the close proximity of the functionalities 920A and 930B to each other, the circuit- and packet-switched domains are currently tightly connected.

With reference now to FIG. 9B, the stepwise migration commences by replacing the RAN 910A with a RAN having IP transport capabilities, designated in the figure by the reference numeral 910B. Signaling across the RAN 910B is preferably access specific and carried over an IP protocol. Similarly, the legacy circuit-switched functionalities 920A are replaced by a legacy CS system having IP transport capabilities, designated in the figure by the reference numeral 920B. Signaling here is preferably over IP instead of SS7, and voice carried over IP instead of T1-type trunks. Preferably, the "IP-function" of CS network 920B is predominantly based upon open IETF standards. As shown in FIG. 9B, however, the CS 920B and PS 930B domains are still tightly linked.

With reference now to FIG. 9C, with the introduction of the ACS 830 and associated interconnectivity, the tight coupling of the CS and PS domains, designated in the figure by 920C and 930C, respectively, is broken, permitting pure packetized communications with the RAN 910C bypassing the MSC therein. In particular, the decoupling of the relevant MSC functionality makes it possible to build a pure packet switched cdma2000 network without an MSC. As discussed, with packet session control and mobility management presently handled by MSCs, the inherent difficulties to make any significant changes to Session Control and mobility management of packet data, particularly, on the A interface, the MSC itself and ANSI-41, the MSC centric model is faulty, particularly with regard to multimedia services. The rupture of the CS and PS domains by inclusion of the ACS 830 cures the foreseeable problems with the current paradigm.

As discussed, the traditional CS services may be carried over IP (920B) and the radio access network 910B may evolve towards IP at different paces and the steps of the migration are relatively independent and not sequential in time.

With reference now to FIG. 9D, there is illustrated an emerging all-IP solution. In particular, a RAN with IP transport capabilities, designated in the figure by the reference numeral 910D, communicates with a diminishing legacy CS system having IP transport capabilities, designated by the reference numeral 920D, and a growing PS system 930D. For example, in this evolving model any multimedia (MM) call models are built in a quality-of-service (QoS) packet core network, e.g., the CSCF 875 in FIG. 8. The network, therefore, is not only a bearer network but also an MM service provider network able to provide multimedia services to users. It should be understood, however, that this step may be divided into a number of discrete substeps, as is understood in the art.

The intermediate model illustrated in FIG. 9D demonstrates that legacy telephone system components may evolve in parallel to the development of any new IP-all-the-way multimedia types of services, simultaneously supporting legacy signaling and terminals.

Finally, with reference to FIG. 9E, there is illustrated a RAN 910E having full IP transport capabilities via a PS system 930E handling all communications with no legacy components.

It should be understood that the ACS as described herein is preferably an entity that manages the control part of the MSC for packet data, and should not be involved in the actual switching or routing of user packet data.

Although preferred embodiments of the system architecture and methodology of the present invention have been illustrated in the accompanying Drawings and described in the foregoing Detailed Description, it is understood that the invention is not limited to the embodiments shown, but is capable of numerous rearrangements, modifications and substitutions without departing from the spirit of the invention as set forth and defined by the following claims.

What is claimed is:

1. An apparatus for facilitating the step-wise migration of a telecommunication network containing a Mobile Services Switching Center (MSC) from a mixed circuit-switched and packet-switched network to an all packet switched network comprising:

an access control server connected to at least one base station, said at least one base station being in wireless communication with at least one mobile station, said at least one base station having a circuit-switched connection to said MSC, said access control server including a signaling interface to manage packetized communications within said telecommunication network independent of said MSC, such that said MSC facilitates only circuit-switched communications within said telecommunication network;

a packet data service network (PDSN) and an authorization, authentication, and accounting unit (AAA) in communication with said access control server; and a migratory interface to enable synchronization between said access control server and said MSC.

2. The apparatus according to claim 1, wherein said at least one mobile station comprises a mixture of legacy mobile stations and all-packetized mobile stations.

3. The apparatus according to claim 1, further comprising:

a Packet Authentication Center (PAC) in communication with said access control server.

4. The apparatus according to claim 3, wherein said PAC contains subscriber profiles for authentication and authorization of packet data.

5. The apparatus according to claim 1, wherein said network further comprises:

a home location register (HLR) in communication with said MSC.

6. The apparatus according to claim 1, wherein said network further comprises:

a packet data service network (PDSN) in communication with said base station.

7. The apparatus according to claim 6, wherein said network further comprises:

a home agent unit (HA) and an authorization, authentication, and account unit (AAA) in communication with said PDSN.

8. The apparatus according to claim 1, wherein said PDSN is in communication with said base station via a packet control function.

9. The apparatus according to claim 1, wherein said access control server maintains and updates a subscriber packet service subscription profile and actual packet session characteristics.

10. The apparatus according to claim 1, wherein said access control server is responsible for bearer control and mobility management associated with packet services.

11. The apparatus according to claim 1, wherein said MSC center maintains control and handling procedures for said circuit-switched communications.

12. The apparatus according to claim 1, wherein said network comprises a code division multiple access wireless telecommunications network.

13. A wireless communication system, comprising:

a packet data carrier comprising a plurality of bearers associated with a plurality of packet data services;

a plurality of mobile devices configured to communicate packet data over the packet data carrier, and to use the plurality of bearers to access the plurality of packet data services;

a base station configured to communicate with the respective mobile devices over the packet data carrier; and a packet data service access monitor, the packet data service access monitor comprising a packet authentication center (PAC) configured to maintain a packet service profile for each of the plurality of mobile devices, and an access control server (ACS) including a signaling interface and communicatively coupled with the PAC and the base station, the ACS configured to manage packet data services for the plurality of mobile device based, at least in part, on their respective packet service profiles.

14. The wireless communication system of claim 13, wherein the ACS and the base station communicate over an Internet protocol (IP) based communication link.

15. The wireless communication system of claim 13, wherein the packet data includes packetized voice data.

16. The wireless communication system of claim 13, wherein the ACS is configured to track and maintain a session profile for each packet data communication involving a respective mobile device.

17. The wireless communication system of claim 13, wherein the mobile devices are configured to switch from a first packet data service associated with a first bearer to a second packet data service associate with a second bearer, and wherein the ACS is configured to manage handoffs of the respective mobile devices from the first bearer to the second bearer.

18. A communication system employing packetized communications for voice and data transmissions, the communication system comprising:
   a code division multiple access wireless communication network having a mobile station and a base transceiver station configured to support wireless packetized communications therebetween;
   an access control server in communication with the base transceiver station and including a signaling interface to manage the wireless packetized communications;
   a mobile services switching center in communication with the base transceiver station, the mobile services switching center servicing circuit-switched communications with the mobile station within the code division multiple access communication network; and
   a migratory interface to enable synchronization between the access control server and the mobile services switching center.

19. The communication system of claim 18, wherein the circuit-switched communications with the mobile services switching center comprise voice only communications.

20. The communication system of claim 18, further comprising a home location register (HLR) in communication with the mobile services switching center.

21. The communication system of claim 18, wherein the packet service means within the access control server services packet-switched data only communications with the mobile station within the code division multiple access communication network.

22. The communication system of claim 18, wherein the access control server is an Internet Protocol (IP) entity comprising means therein for setting up and maintaining at least one packet data session.

23. The communication system of claim 18, further comprising a Packet Authentication Center (PAC) in communication with the access control server.

24. The communication system of claim 18, wherein the PAC contains subscriber profiles for authentication and authorization of packet data.

25. The communication system of claim 18 further comprising a packet data service network (PDSN) in communication with the base transceiver station.

26. The communication system of claim 25, further comprising a home agent unit (HA) and an authorization, authentication, and account unit (AAA) in communication with the PDSN.

27. The communication system of claim 25, wherein the PDSN is in communication with the base transceiver station via a packet control function.

28. The telecommunication system of claim 18, further comprising a packet data service network (PDSN) and an authorization, authentication, and accounting unit (AAA) in communication with the access control server.

29. The communication system of claim 18, wherein the access control server maintains and updates a subscriber packet service subscription profile and actual packet session characteristics.

30. The communication system of claim 18, wherein the access control server is responsible for bearer control and mobility management associated with packet services.

31. A method of mobile communication employing a mobile device, the mobile device configured for circuit switched communication and packet data communication in a wireless communication system comprising a circuit switched network and a packet data network, the method comprising:
   generating a registration request at the mobile device, the registration request comprising circuit switched specific parameters and packet data specific parameters;
   generating a registration message based on the circuit switched specific parameters in the registration request;
   transmitting the registration message to the circuit switched network;
   authenticating the mobile device in the circuit switched network based on the registration message;
   generating an authentication message from the packet data specific parameters in the registration request;
   transmitting the authentication message to the packet data network; and
   authenticating the mobile device in the packet data network based on the authentication message.

32. The method of claim 31, further comprising
   the mobile device sending a packet data session request to the packet data network;
   the packet data network authorizing the packet data session request based on a packet service profile associated with the mobile device;
   the mobile device accessing a traffic channel in the packet data network; and
   the mobile device opening a Radio Network-Packet Network (R-P) connection over the traffic channel for the packet data session.

33. The method of claim 32, further comprising storing information related to the packet data session request and storing a quality of service profile for the packet data session.

34. The method of claim 32, further comprising notifying the circuit switched network that a packet data session is active for the mobile device in the packet data network.

35. The method of claim 32, further comprising:
   receiving an incoming circuit switched communication through the circuit switched network;
   the circuit switched network requesting that the mobile device accept the circuit switched communication; and
   the mobile device, accessing a traffic channel in the circuit switched network in order to accept the circuit switched communication.

36. The method of claim 35 further comprising notifying the packet data network that the mobile device is engaged in a circuit switched communication in the circuit switched network.

* * * * *